United States Patent
Kim

(10) Patent No.: US 11,346,435 B2
(45) Date of Patent: May 31, 2022

(54) REDUCER OF ELECTRIC POWER STEERING APPARATUS

(71) Applicant: MANDO CORPORATION, Gyeonggi-do (KR)

(72) Inventor: Jong Han Kim, Gyeonggi-do (KR)

(73) Assignee: MANDO CORPORATION, Gyeonggi-Do (KR)

(*) Notice: Subject to any disclaimer, the term of this patent is extended or adjusted under 35 U.S.C. 154(b) by 178 days.

(21) Appl. No.: 16/417,332

(22) Filed: May 20, 2019

(65) Prior Publication Data

US 2019/0353238 A1 Nov. 21, 2019

(30) Foreign Application Priority Data

May 18, 2018 (KR) .................. 10-2018-0056840

(51) Int. Cl.
*F16H 55/24* (2006.01)
*F16H 1/16* (2006.01)
(Continued)

(52) U.S. Cl.
CPC .......... *F16H 55/24* (2013.01); *B62D 5/0409* (2013.01); *B62D 5/0454* (2013.01); *F16H 1/16* (2013.01); *F16H 2057/0213* (2013.01)

(58) Field of Classification Search
CPC .... F16H 55/24; F16H 1/16; F16H 2057/0213; B62D 5/0409; B62D 5/0454
(Continued)

(56) References Cited

U.S. PATENT DOCUMENTS

| 9,193,384 | B1* | 11/2015 | Murakami | ............. F16H 55/24 |
| 2002/0053249 | A1* | 5/2002 | Jammer | .................... F16H 1/16 74/425 |

(Continued)

FOREIGN PATENT DOCUMENTS

| DE | 20 2013 102400 | 6/2013 |
| EP | 0 943 842 | 9/1999 |

(Continued)

OTHER PUBLICATIONS

Office Action dated Jun. 12, 2019 for Korean Application No. 10-2018-0056840 and its English machine translation by Google Translate.
(Continued)

*Primary Examiner* — Jake Cook
*Assistant Examiner* — T. Scott Fix
(74) *Attorney, Agent, or Firm* — Ladas & Parry, LLP

(57) ABSTRACT

A reducer of an electric power steering apparatus includes: a worm shaft having a first end thereof supported by a first bearing coupled to a housing and a second end supported by a second bearing coupled to the housing; a damper axially supported on an outer race of the second bearing; and a damper support member having a first side axially supported on the damper and a second side supported on an inner face of the housing. The worm shaft can be assembled with constant rotational torque at an accurate position with respect to the centers of the bearings at the opposite ends. And, the axial and radial movements of the worm shaft can be buffered and the load applied to the worm shaft in the direction in which the worm shaft is engaged with the worm wheel can be reduced.

18 Claims, 14 Drawing Sheets

(51) Int. Cl.
*B62D 5/04* (2006.01)
*F16H 57/021* (2012.01)
(58) Field of Classification Search
USPC ............... 180/444; 74/89.14, 724, 425, 500
See application file for complete search history.

(56) References Cited

U.S. PATENT DOCUMENTS

| | | | | |
|---|---|---|---|---|
| 2002/0053250 A1* | 5/2002 | Ozsoylu | ............... | F16H 1/16 74/425 |
| 2002/0088305 A1* | 7/2002 | Kitagawa | ............ | H02K 7/1166 74/813 R |
| 2002/0121401 A1* | 9/2002 | Shimizu | ................ | F16C 39/02 180/444 |
| 2004/0149512 A1* | 8/2004 | Tsutsui | ................. | F16C 25/083 180/443 |
| 2004/0210365 A1* | 10/2004 | Tanaka | ..................... | F16F 1/32 701/41 |
| 2004/0245040 A1* | 12/2004 | Eda | .......................... | F16H 1/16 180/444 |
| 2005/0224278 A1* | 10/2005 | Segawa | ................ | F16H 57/021 180/444 |
| 2006/0117883 A1* | 6/2006 | Yasuda | ............... | B62D 5/0409 74/388 PS |
| 2006/0191736 A1* | 8/2006 | Maeda | ................ | B62D 5/0409 180/444 |
| 2007/0102228 A1 | 5/2007 | Shiina et al. | | |
| 2010/0116582 A1 | 5/2010 | Rho et al. | | |
| 2011/0017542 A1* | 1/2011 | Kim | ..................... | F16H 57/039 180/444 |
| 2011/0147113 A1* | 6/2011 | Ko | .......................... | B62D 3/04 180/444 |
| 2012/0061168 A1* | 3/2012 | Hamakita | ................ | F16D 3/68 180/444 |
| 2012/0111657 A1* | 5/2012 | Hamakita | ............. | F16C 27/066 180/444 |
| 2013/0025960 A1* | 1/2013 | Hama | ..................... | F16H 1/16 180/444 |
| 2013/0075189 A1* | 3/2013 | Sekikawa | ............ | B62D 5/0409 180/444 |
| 2013/0133974 A1* | 5/2013 | Hamakita | ............. | B62D 5/0403 180/444 |
| 2013/0270032 A1* | 10/2013 | Tanaka | ................. | B62D 5/0454 180/444 |
| 2014/0041957 A1* | 2/2014 | Cymbal | .................. | F16C 23/10 180/444 |
| 2014/0083794 A1* | 3/2014 | Ishii | ...................... | B62D 5/0409 180/444 |
| 2014/0182401 A1* | 7/2014 | Ishii | ...................... | B62D 5/0409 74/89.14 |
| 2014/0352467 A1* | 12/2014 | Kwon | .................. | B62D 5/0409 74/400 |
| 2015/0059506 A1* | 3/2015 | Kwon | ..................... | F16C 25/08 74/425 |
| 2015/0075899 A1* | 3/2015 | Kikuchi | ................. | F16C 35/077 180/444 |
| 2015/0107384 A1* | 4/2015 | Kwon | ..................... | B62D 3/04 74/89.14 |
| 2015/0197277 A1* | 7/2015 | Mehl | ..................... | F16H 57/022 180/444 |
| 2016/0185381 A1* | 6/2016 | Noguchi | .............. | B62D 5/0409 180/444 |
| 2016/0201760 A1* | 7/2016 | Kwon | ..................... | F16H 55/24 74/409 |
| 2016/0201761 A1* | 7/2016 | Kwon | ................... | F16C 27/066 74/425 |
| 2016/0318544 A1* | 11/2016 | Kawamura | ............. | F16H 55/24 |
| 2017/0274925 A1* | 9/2017 | Kimijima | ............ | B62D 5/0409 |
| 2018/0066713 A1* | 3/2018 | Oosawa | ................. | F16D 3/58 |
| 2018/0073627 A1* | 3/2018 | Gibbs | ................... | F16H 57/039 |
| 2018/0266542 A1* | 9/2018 | Kawamura | ........... | B23P 19/048 |
| 2018/0304915 A1* | 10/2018 | Kawamura | ............... | F16H 1/16 |
| 2019/0031228 A1* | 1/2019 | Shimoda | ................. | F16H 1/16 |
| 2019/0225258 A1* | 7/2019 | Vonier | ................ | F16H 57/021 |
| 2019/0234505 A1* | 8/2019 | Ishii | .......................... | F16H 1/16 |

FOREIGN PATENT DOCUMENTS

| | | |
|---|---|---|
| EP | 1 065 132 | 1/2001 |
| EP | 1 452 419 | 9/2004 |
| JP | 2005-88820 | 4/2005 |
| JP | 2006-175891 | 7/2006 |
| JP | 2011-110979 | 6/2011 |
| JP | 2012-197028 | 10/2012 |
| KR | 10-2010-0073550 | 7/2010 |
| KR | 10-2011-0060544 | 6/2011 |
| KR | 10-2011-0076112 | 7/2011 |
| KR | 10-2013-0003312 | 1/2013 |
| KR | 10-2014-0014714 | 2/2014 |
| KR | 10-1410500 | 6/2014 |
| KR | 10-1594305 | 2/2016 |
| KR | 10-1694279 | 1/2017 |
| KR | 10-1759758 | 7/2017 |

OTHER PUBLICATIONS

Notice of Allowance dated Oct. 10, 2019 for Korean Application No. 10-2018-0056840 and its English machine translation by Google Translate.

Extended European Search Report dated Oct. 30, 2019 for EP Patent Application No. 19175173.4.

* cited by examiner ary drawings. In adding reference numerals to components of each drawing, it should be noted that the same components will be designated by the same reference numerals, if possible, although they are shown in different drawings. Further, in describing the embodiments of the present disclosure, detailed descriptions related to well-known functions or configurations will be omitted when they may make subject matters of the present disclosure unnecessarily obscure.

REDUCER OF ELECTRIC POWER STEERING APPARATUS

CROSS REFERENCE TO RELATED APPLICATION

This application claims priority from Korean Patent Application No. 10-2018-0056840, filed on May 18, 2018, which is hereby incorporated by reference for all purposes as if fully set forth herein.

BACKGROUND OF THE INVENTION

1. Field of the Invention

Embodiments disclosed herein relate to a reducer of an electric power steering apparatus, and more particularly, to a reducer of an electric power steering apparatus, in which bearings supported at the opposite ends of a worm shaft are supported by a housing, which makes it possible to assemble the worm shaft with a constant rotational torque at a precise position with respect to the centers of the bearings at the both ends, and in which rotational torque and noise caused by friction between the worm shaft and the worm wheel are reduced by buffering axial and radial movements of the worm shaft and reducing the load applied to the worm shaft in the direction in which the worm shaft is engaged with a worm wheel, whereby a pleasant steering feeing can be provided.

2. Description of the Prior Art

A conventional reducer of an electric power steering apparatus has a structure, in which a worm shaft having a worm disposed on the outer circumference thereof is engaged with a worm wheel coupled to a steering shaft, and the worm shaft is connected to a motor via a damping coupler such that the torque of the motor is transmitted to the steering shaft, thereby assisting a driver's steering wheel operation.

In addition, bearings are provided at the opposite ends of an worm shaft in order to support the rotation of the worm shaft, bearings are provided at the opposite ends of the worm shaft. A clearance compensation mechanism is provided to support the worm shaft in the direction in which the work shaft is engaged with the worm wheel in order to reduce noise occurring due to the wear of the worm wheel.

The clearance compensation mechanism is provided to support a bearing provided on the side opposite the motor. In order to smoothly compensate for the clearance, the bearing on the side opposite the motor needs to be mounted to be slidable in a direction in which the worm shaft and the worm wheel are engaged with each other.

Therefore, since the bearings supporting the rotation of the worm shaft are not fixed to the housing, it is difficult to accurately set the assembly position during the assembly of the worm shaft and it also is difficult to assemble the worm shaft with constant rotational torque.

In addition, the damper is provided in order to buffer the axial and radial movements of the worm shaft. However, the load applied to the damper supporting the worm shaft when the worm shaft is moved in the radial direction generates rotational torque and noise due to friction between the worm shaft and the worm wheel.

SUMMARY OF THE INVENTION

Embodiments disclosed herein have been made in view of the foregoing, and aim to make it possible to assemble a worm shaft with constant rotational torque at an accurate position with respect to the centers of the bearings at the opposite ends by making the bearings supported by the housing at the opposite ends of the worm shaft.

In addition, embodiments disclosed herein aim to provide a pleasant steering feeling by reducing the rotational torque and noise generated due to friction between a worm shaft and a worm wheel by buffering the axial and radial movements of the worm shaft and reducing the load applied to the worm shaft in the direction in which the worm shaft is engaged with the worm wheel.

The aspect of the present disclosure is not limited thereto, and other unmentioned aspects of the present disclosure may be clearly appreciated by those skilled in the art from the following descriptions.

Embodiments disclosed herein provide a reducer of an electric power steering apparatus that includes: a worm shaft having a first end coupled to a damping coupler and supported by a first bearing coupled to a housing and a second end supported by a second bearing coupled to the housing; a damper axially supported on an outer race of the second bearing; and a damper support member having a first side axially supported on the damper and a second side supported on an inner face of the housing.

According to embodiments disclosed herein, since the bearings are supported by the housing at the opposite ends of the worm shaft, it is possible to assemble the worm shaft with constant rotational torque at an accurate position with respect to the centers of the bearings at the opposite ends.

In addition, by buffering the axial and radial movements of the worm shaft and reducing the load applied to the worm shaft in the direction in which the worm shaft is engaged with the worm wheel, the rotational torque and noise generated due to friction between the worm shaft and the worm wheel are reduced, whereby a pleasant steering feeling can be provided.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
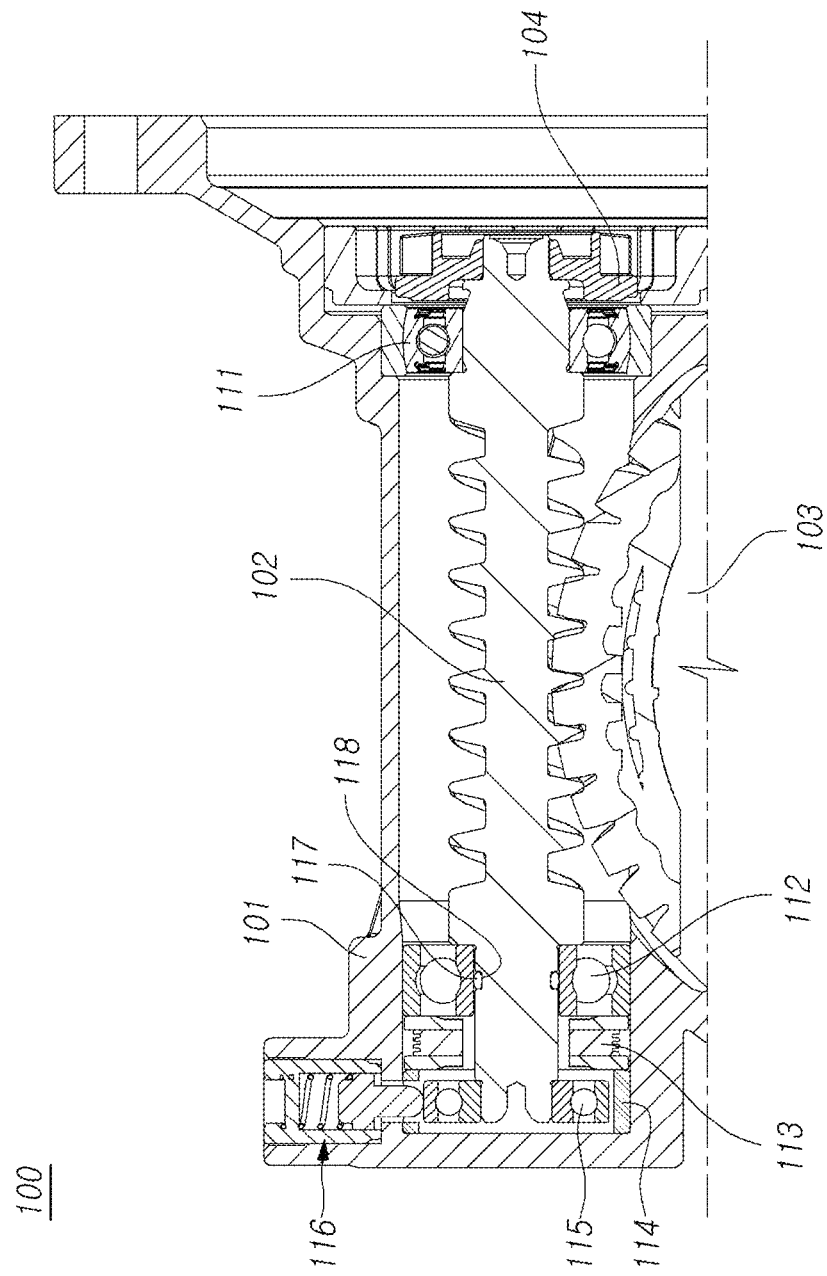
FIG. 1 is a cross-sectional view illustrating a part of a reducer of an electric power steering apparatus (hereinafter, simply referred to as "reducer") according to embodiments.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
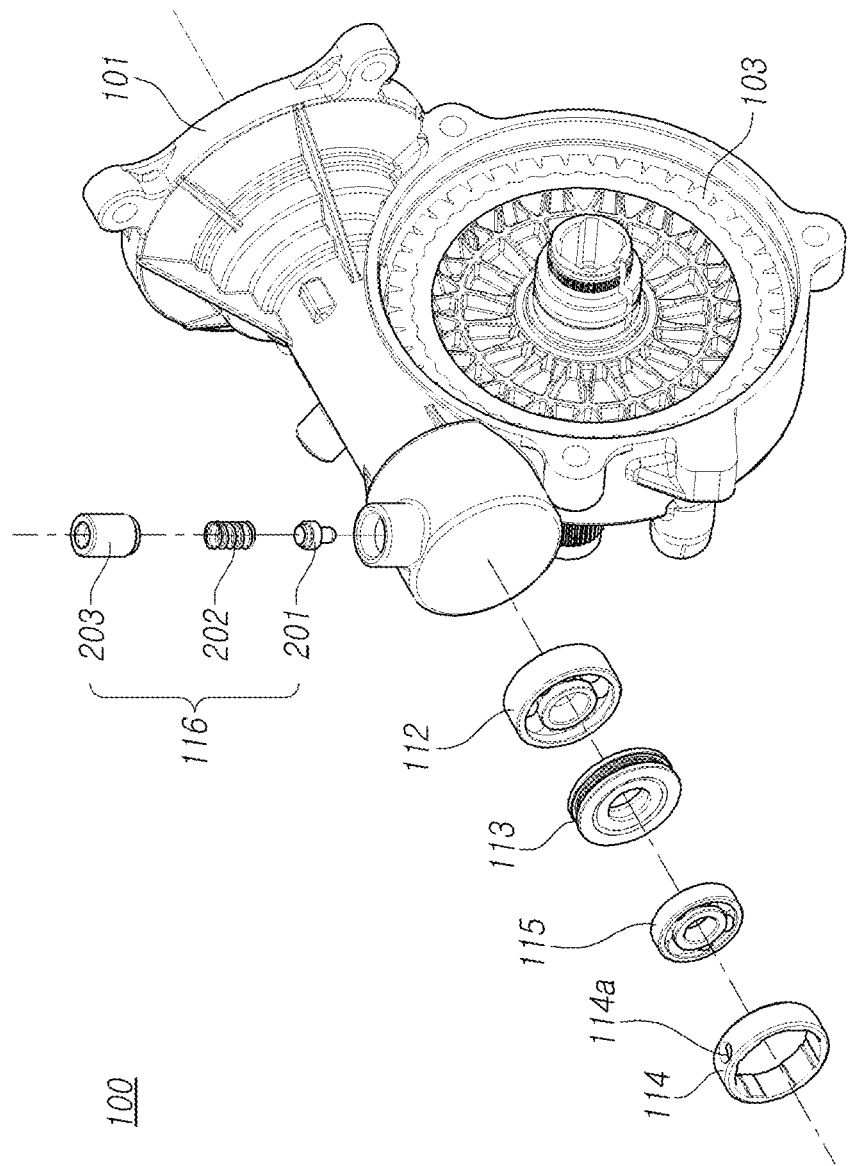
FIG. 2 is an exploded perspective view of the reducer of FIG. 1.
Figure 3:
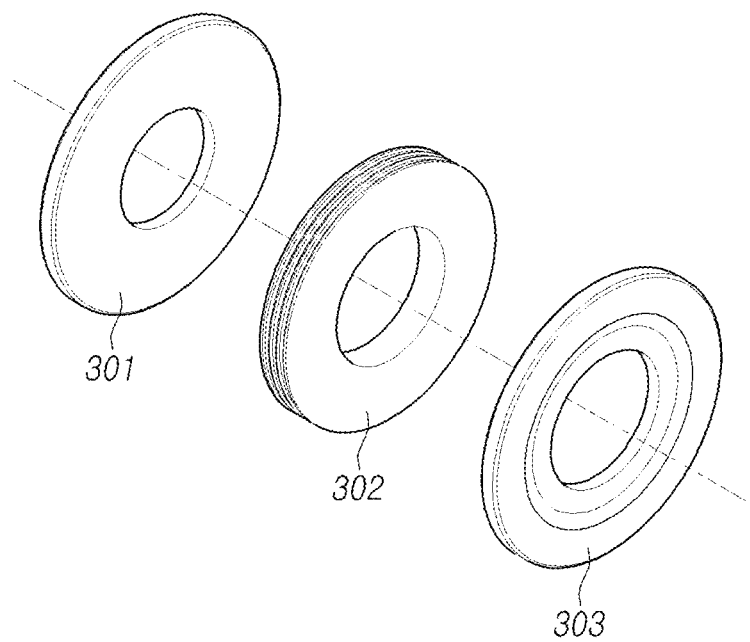
FIG. 3 is a cross-sectional view illustrating a part of a reducer according to embodiments.
Figure 4:
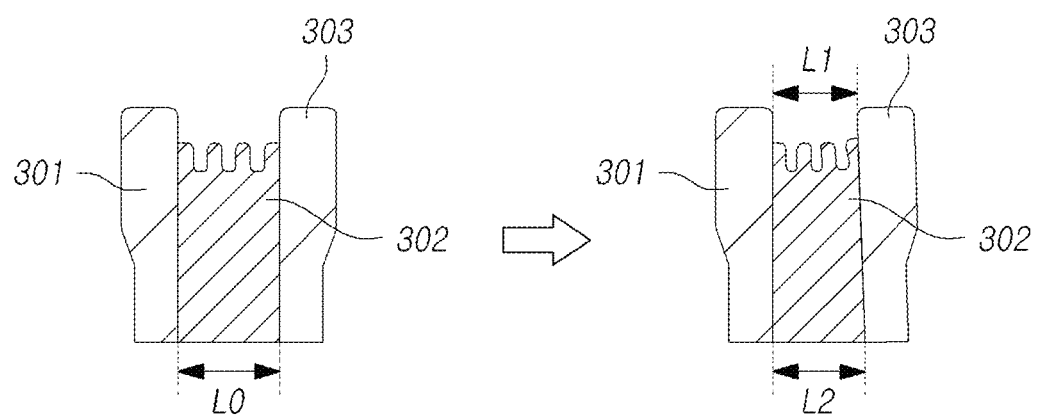
FIG. 4 is an exploded perspective view of a part of the reducer of FIG. 1.
Figure 5:
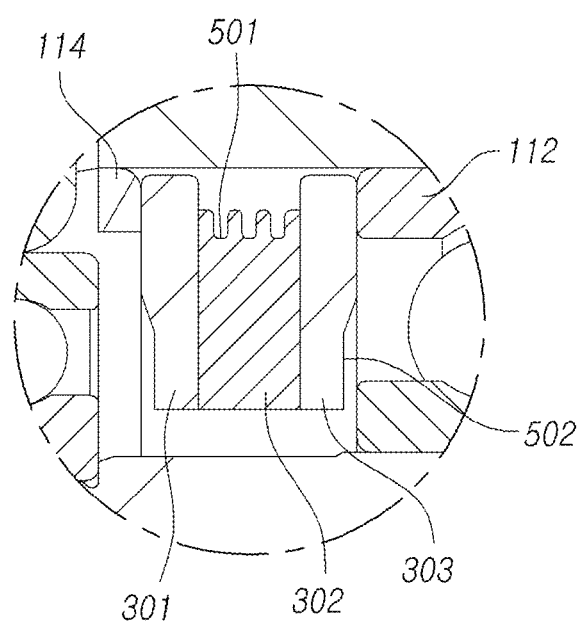
FIG. 5 shows cross-sectional views illustrating an operating state of a part of the reducer of FIG. 1.
Figure 9:
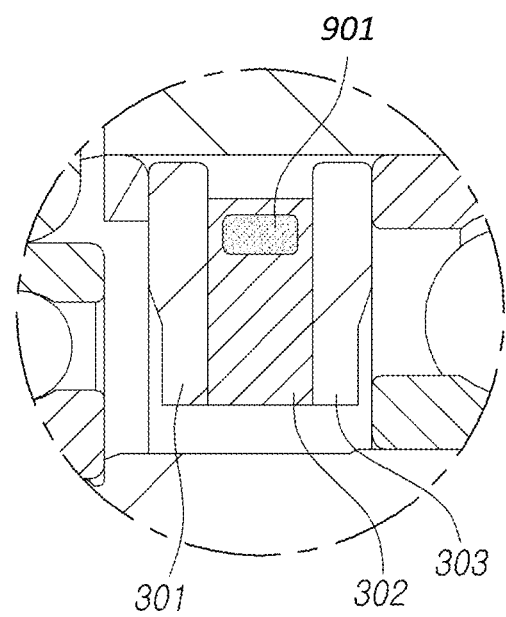
Figure 10:
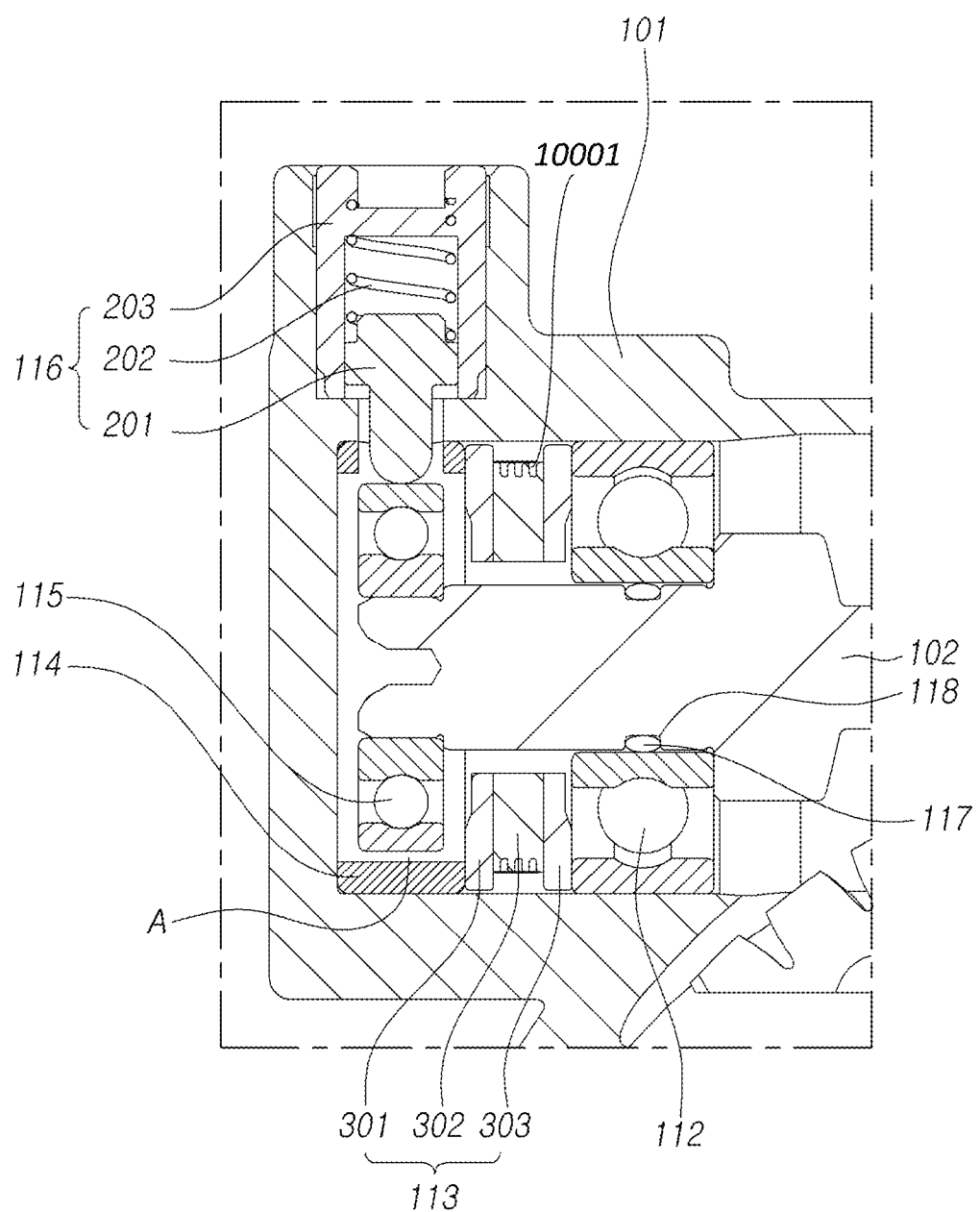
Figure 11:
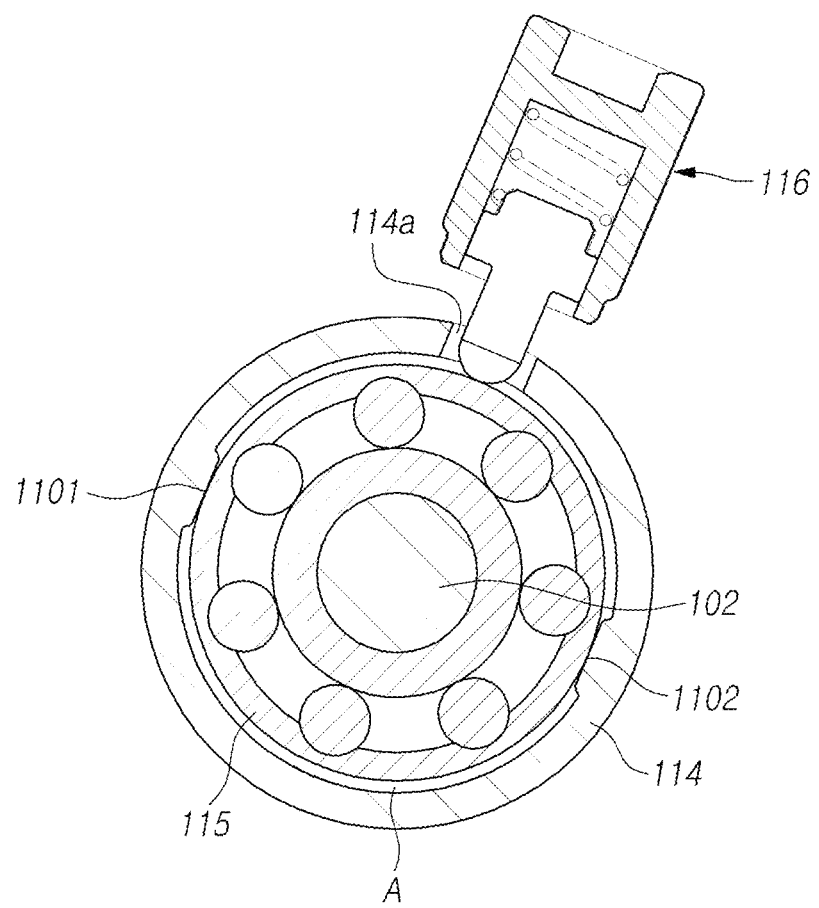
FIG. 11 is a cross-sectional view illustrating a part of a reducer according to embodiments.
Figure 12:
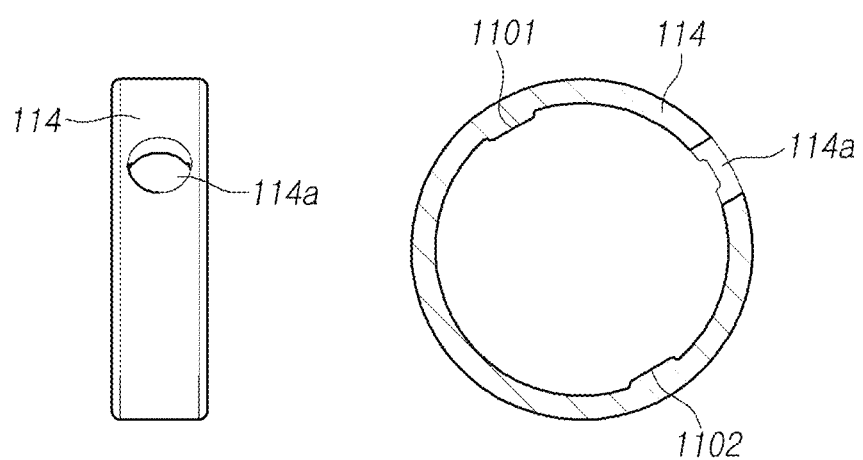
FIG. 12 shows a cross-sectional view and a side view of a part of the reducer of FIG. 11.
Figure 13:
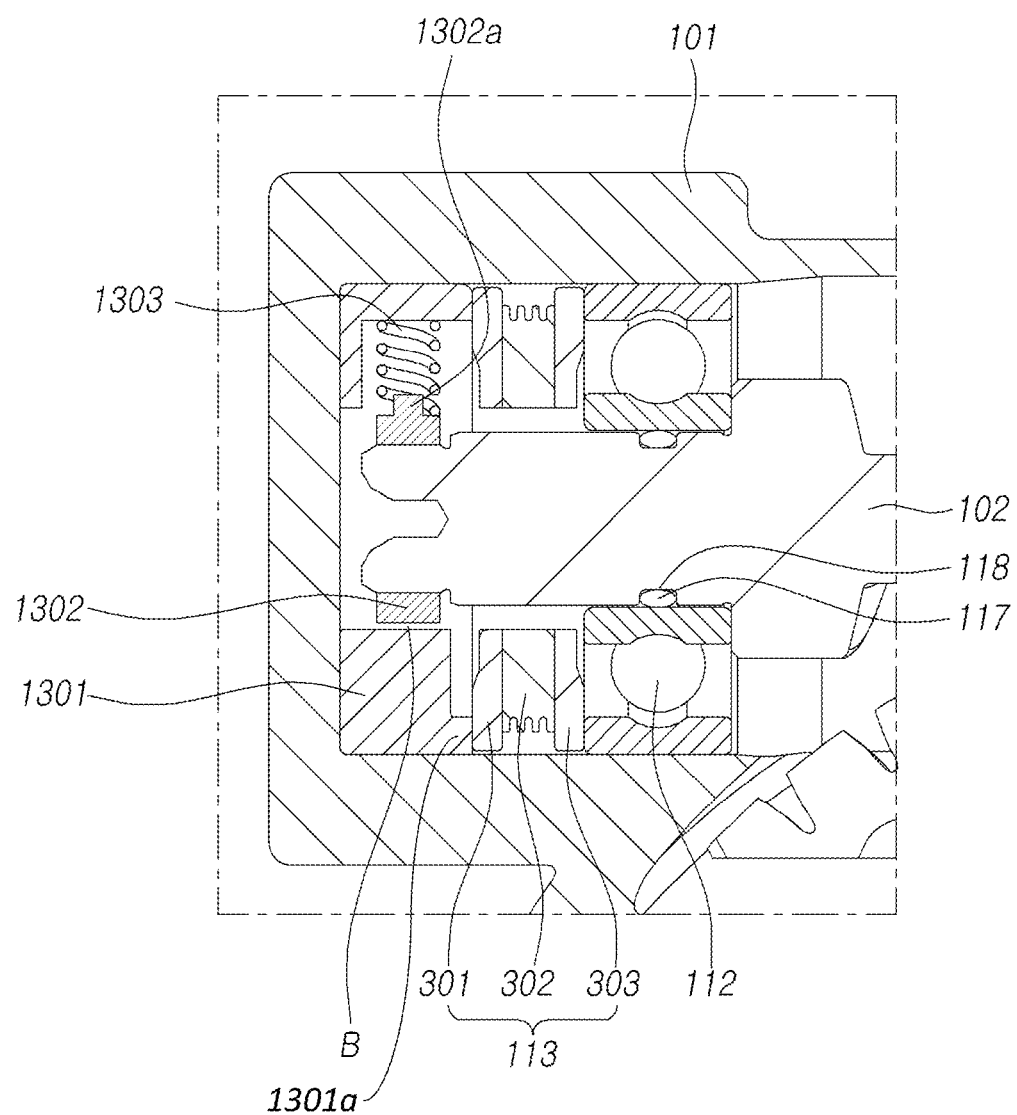
FIGS. 13 to 14 are cross-sectional views each illustrating a part of a reducer according to embodiments.
Figure 14:
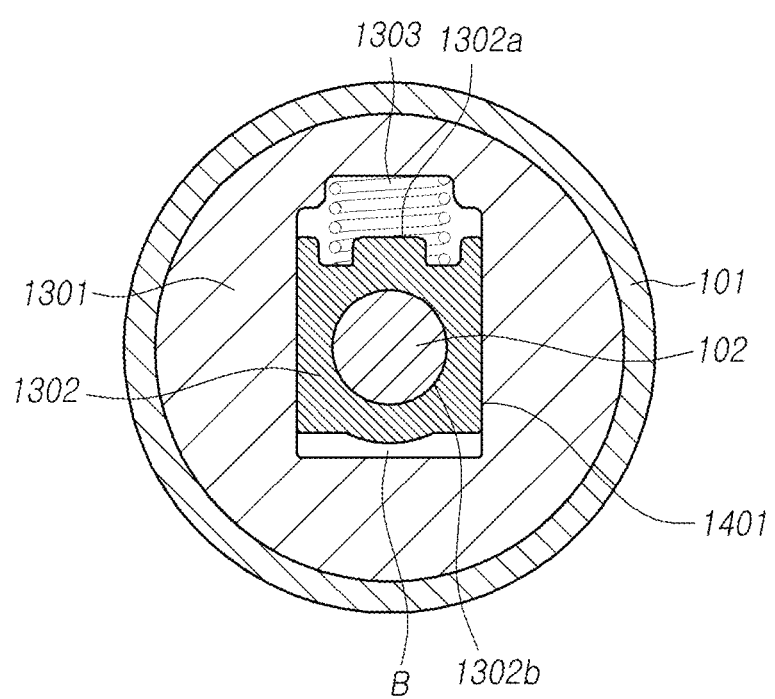

FIG. 1 is a cross-sectional view illustrating a part of a reducer of an electric power steering apparatus according to embodiments, FIG. 2 is an exploded perspective view of the reducer of FIG. 1, FIG. 3 is a cross-sectional view illustrating a part of a reducer according to embodiments, FIG. 4 is an exploded perspective view of a part of the reducer of FIG. 1, FIG. 5 shows cross-sectional views illustrating an operating state of a part of the reducer of FIG. 1, FIGS. 6 to 10 are cross-sectional views each illustrating a part of a reducer according to embodiments, FIG. 11 is a cross-sectional view illustrating a part of a reducer according to embodiments, FIG. 12 shows a cross-sectional view and a side view of a part of the reducer of FIG. 11, and FIGS. 13 to 14 are cross-sectional views each illustrating a part of a reducer according to embodiments.

Hereinafter, descriptions will be made with reference to FIGS. 1 and 2.

A reducer of the electric power assisted steering apparatus 100 (hereinafter, simply referred to as "reducer 100") according to the present embodiment includes a worm shaft 102 having a first end coupled to a damping coupler 104 and supported by a first bearing 111 coupled to a housing 101 and a second end supported by a second bearing 112 coupled to housing 101, a damper 113 axially supported on an outer race of the second bearing 112, and a damper support member 114 or 1301 having a first side axially supported on the damper 113 and a second side supported on the inner face of the housing 101.

The worm shaft 102 is engaged with a worm wheel 103 coupled to a steering shaft (not illustrated), and a motor (not illustrated) rotates the worm shaft 102 and transmits assist torque to the steering shaft (not illustrated) so as to assist a driver's steering wheel operation.

The worm shaft 102 and the motor are connected to each other via the damping coupler 104 including a damper (not illustrated), the first end of the worm shaft 102, which is coupled to the damping coupler 104 is supported by the first bearing 111 coupled to the housing 101 and the second end is supported by the second bearing 112 coupled to the housing 101.

That is, since the first bearing 111 and the second bearing 112, which respectively support the first and second ends of the worm shaft 102, are provided to be supported by the housing 101, it is possible to assemble the worm shaft 102 to be engaged with the worm wheel 103 with constant rotational torque by measuring the distance between axes of the worm shaft 102 and the worm wheel 103 with reference to a straight line connecting the centers of the first bearing 111 and the second bearing 112.

The damper 113 is axially supported on the outer race of the second bearing 112. The damper support member 114 or 1301 is supported by the damper 113 on the side opposite the second bearing 112, and acts as a stopper when the damper 113 buffers the axial and radial movements of the worm shaft 102.

That is, the first side of the damper support member 114 or 1301 is axially supported on the damper 113, and the second side is supported on the inner face of the housing 101. According to an embodiment, the damper support member 114 is hollow and includes a through hole 114a, and a third bearing 115 is provided inside the damper support member 114 such that the clearance compensation mechanism 116 is able to compress the worm shaft 102 (see FIG. 3). According to another embodiment, the damper support member 1301 may include a long hole 1301c into which a rotation support member 1302 is inserted, and the clearance compensation member 1303 is able to press the worm shaft 102 (see FIG. 13). Details will be described later.

Referring to FIG. 1, an elastic body 117 may be provided between the inner race of the second bearing 112 and the outer peripheral face of the worm shaft 102. The radial movement of the worm shaft 102 is buffered by the elastic body 117, so that noise is reduced.

As the elastic body 117 is provided, the inner race of the second bearing 112 and the outer peripheral face of the worm shaft 102 may be radially spaced apart from each other. Thus, when the clearance compensation mechanism 116 or the clearance compensation member 1303 compresses the worm shaft 102 in the direction in which the worm shaft 102 is engaged with the worm wheel 103, the second end of the worm shaft 102 is rotated with respect to the first end thereof, which is supported by the first bearing 111, so the clearance occurring due to wear can be compensated.

The worm shaft 102 includes a groove 118 disposed on the outer peripheral face thereof in the circumferential direction, and the elastic body 117 can be inserted into the groove 118. As the elastic body 117, a component having a circular shape like an O-ring to have a rigidity may be used.

Meanwhile, referring to FIG. 4, the damper 113 may include a first support portion or member 301 supported by the damper support member 114 or 1301, a second support portion or member 303 supported by the outer race of the second bearing 112, and a damping portion or member 302 provided between the first support portion or member 301 and the second support portion or member 303.

That is, the damping portion or member 302 provided between the first support portion or member 301 and the second support portion or member 303 is compressed or tensioned to absorb the axial and radial movements of the worm shaft 102.

At this time, in order to prevent an increase in the rotational torque and the generation of noise due to the friction between the worm shaft 102 and the worm wheel 103 by the radial elastic force applied to the worm shaft 102 by the damper 113 being compressed or tensioned, the damping portion or member 302 may be provided between the inner diameter portions of the first support portion or member 301 and the second support portion or member 303, or the circumferential grooves 601 or the like may be disposed on the outer peripheral face of the damping portion or member 302.

That is, not only the elastic force of the clearance compensation mechanism 116 or the clearance compensation member 1303 but also the elastic force of the damper 113 is applied to the worm shaft 102 in the direction in which the worm shaft 102 is engaged with the worm wheel 103. Thus, in order to reduce rotational torque and noise caused due to friction, it is necessary to reduce the radial load applied to the worm shaft 102 by the damper 113.

First, the damping portion or member 302 may be provided between the inner diameter portions of the first support portion or member 301 and the second support portion or member 303.

Referring to FIGS. 3 and 13, the damper support member 114 is hollow or the damper support member 1301 includes a protrusion 1301a, so that the outer diameter portion of the first support portion or member 301 is axially supported on the damper support member 114 or 1301 and the second support portion or member 303 is axially supported on the outer race of the second bearing 112.

At this time, the damping portion or member 302 is provided between the inner diameter portions of the first support portion or member 301 and the second support portion or member 303, and when a radial movement is generated in the worm shaft 102, the compressed or tensioned degree of the damping portion or member 302 is reduced so that the radial load applied to the worm shaft 102 can be reduced.

That is, since the outer diameter portions of the first support portion member 301 and the second support portion or member 303 are axially supported on the damper support member 114 or 1301 and the outer diameter portion of the second bearing 112, the outer diameter portion of the damper 113 is deformed more greatly than the inner diameter portion of the damper 113 when the axial and radial movements of the worm shaft 102 occur.

In other words, referring to FIG. 5, when compared with the width L0 between the first support portion or member 301 and the second support portion or member 303 before the damper 113 is deformed, after the deformation of the damper 113, the width L1 in the outer diameter portion is deformed more greatly than the width L2 in the inner diameter portion.

Meanwhile, the first support portion or member 301 and the second support portion or member 303 may include stepped portions 502 disposed on the outer faces thereof. As illustrated in the drawing, the stepped portions 502 are configured such that the inner diameter side thicknesses of the first support portion or member 301 and the second support portion or member 303 are thinner than the outer diameter side thicknesses. Due to the stepped portions 502, the inner diameter portions of the first support portion or member 301 and the second support portion or member 303 are axially spaced apart from the inner races of the damper support member 114 or 1301 and the second bearing 112, respectively. Thus, it is possible to prevent occurrence of noise, which occurs when the first support portion or member 301 or the second support portion or member 303 collides with the inner race of the second bearing 112, the third bearing 115, or the like due to the movement of the worm shaft 102.

Due to the stepped portions 602, the inner diameter portions of the first support portion or member 301 and the second support portion or member 303 are axially spaced apart from the inner races of the damper support member 114 or 1301 and the second bearing 112, respectively. Thus, it is possible to prevent occurrence of noise, which occurs when the first support portion or member 301 or the second support portion or member 303 collides with the inner race of the second bearing 112, the third bearing 115, or the like due to the movement of the worm shaft 102.

Figure 6:
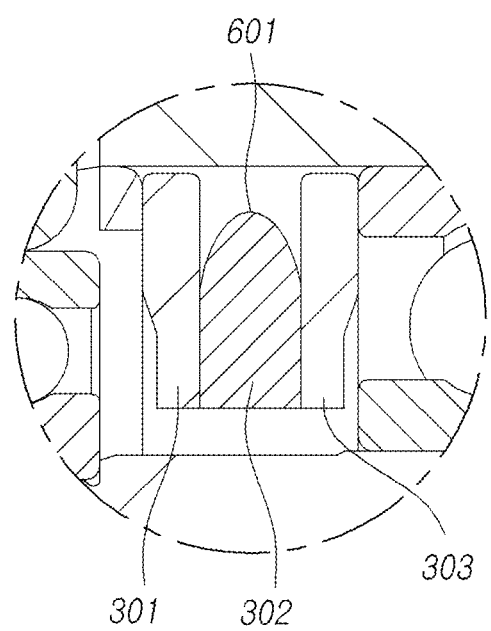
FIGS. 6 to 10 are cross-sectional views each illustrating a part of a reducer according to embodiments.

Next, referring to FIG. 6, the damping portion or member 302 may include circumferential grooves 601 disposed on the outer peripheral face thereof such that the outer diameter side of the damping portion or member 302 has lower rigidity than the inner diameter side and can be easily deformed in the radial direction.

The damping portion or member 302 may include two or more circumferential grooves 601. That is, two or more circumferential grooves 601 may be configured to be axially spaced apart from each other so as to reduce the rigidity of the outer diameter side of the damper 113.

Figure 7:
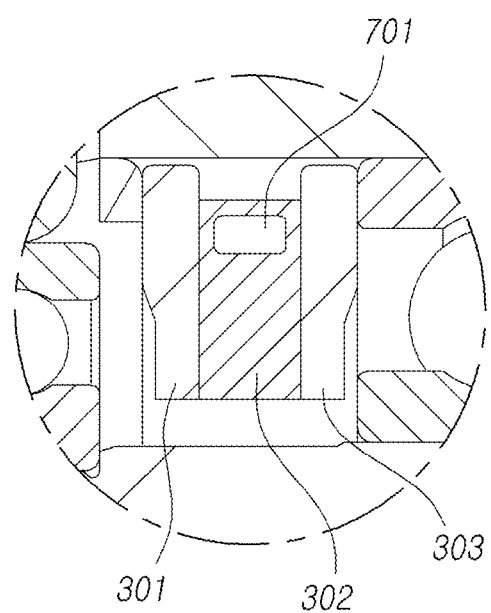
Figure 8:
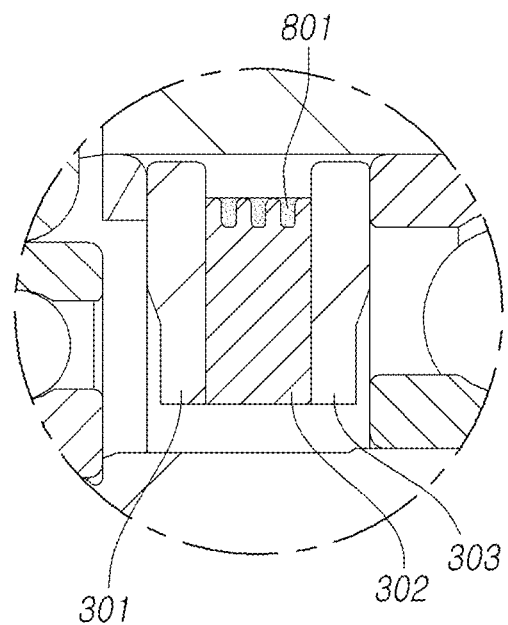

Alternatively, as illustrated in FIG. 7, the damping portion or member 302 may be configured such that the outer peripheral face thereof is convex in the radial direction (see reference numeral 701). Or, as illustrated in FIG. 8, the damping portion or member 302 may include a hollow portion 801 configured therein and disposed at the outer diameter side thereof, so that the rigidity of the damper 113 at the outer diameter side may be reduced.

Meanwhile, as illustrated in FIGS. 9 to 10, the damper 113 may be made of a material having rigidity lower than that of the damping portion or member 302. Thus, by providing a filler or filling member 901 or 10001 in the circumferential grooves 601 or the hollow portion 801, it may be possible to compensate for the axial rigidity of the damper 113.

Since the damping portion or member 302, which is provided with the circumferential grooves 601 and the hollow portion 801, is relatively more greatly deformed at the outer diameter side thereof when the damping portion or member 302 is deformed in the radial direction, it is possible to reduce the radial load applied to the worm shaft 102 by lowering the rigidity on the outer diameter side of the damper 113 due to the circumferential grooves 601 or the like.

As described above, the clearance compensation mechanism 116 or the clearance compensation member 1303 is provided to compensate for the clearance between the worm shaft 102 and the worm wheel 103, which occurs due to wear. Embodiments including the clearance compensation mechanism 116 will be described first, and then embodiments including the clearance compensation member 1303 will be described.

First, referring to FIGS. 3, 11, and 12, the damper support member 114 has a hollow shape, and the second end of the worm shaft 102 may be provided with a third bearing 115 disposed inside the damper support member 114.

Since the damper support member 114 is hollow and is supported by the outer diameter portion of the first support portion or member 301, even if axial and radial movements of the worm shaft 102 occur, the noise, which may be generated when the inner diameter portion of the first support portion or member 301 collides with the damper support member 114, is prevented from being generated.

The damper support member 114 includes a through hole 114a penetrating the inner peripheral face and the outer peripheral face in a direction in which the worm shaft 102 and the worm wheel 103 are engaged with each other. The clearance compensation mechanism 116 is coupled to the housing 101, and compresses the third bearing 115 through the first bearing 114a.

The inner diameter of the damper support member 114 is larger than the outer diameter of the third bearing 115. The damper support member 114 may include bearing support portions 1101 protruding at the positions spaced by right angles from the through hole 114a on the opposite sides of the through hole 114a in the circumferential direction and supported on the third bearing 115, so that the third bearing 115 can be slid while being supported by the clearance compensation mechanism 116 in the direction in which the worm shaft 102 and the worm wheel 103 are engaged with each other.

That is, the bearing support portions 1101 protrude from the inner circumferential face of the damper support member 114 so as to face each other. The third bearing 115 is slid in the direction in which the worm shaft 102 and the worm wheel 103 are engaged with each other while being supported by the bearing support portions 1101 on the opposite sides thereof, and the clearance compensation mechanism 116 compensates for the clearance caused due to wear while compressing the third bearing 115 through the through hole 115.

The clearance compensation mechanism 116 includes a compression member 201 inserted into the through hole 114a and supported by the third bearing 115, a coupling member 203 coupled to the housing 101, and an elastic member 202 elastically supported between the compression member 201 and the coupling member 203.

The clearance compensation mechanism 116 is provided in a coupling hole 101a disposed in the housing 101 (see FIG. 2). One end of the compression member 201 passes through the through hole 114a and is supported on the third bearing 115, and the elastic member 202 and the compression member 201 are slidably inserted into the coupling member 203 and are coupled (e.g., screwed) to the coupling hole 101a.

Next, referring to FIGS. 13 and 14, the damper support member 1301 may include a long hole 1301c configured to extend in the direction in which the worm shaft 102 and the worm wheel 103 are engaged with each other, and the second end of the worm shaft 102 may be provided with a rotation support member 1302, which is inserted into the long hole 1301c. That is, the rotation support member 1302 includes an insertion hole 1302b which passes through the central portion thereof in the axial direction, and the second end of the worm shaft 102 is inserted into the insertion hole 1302b.

The rotation support member 1302 is slidably supported in the long hole 1301c, and the long hole 1301c is provided with a clearance compensation member 1303, which includes a first end supported by the rotation support member 1302 and a second end supported by the damper support member 1301 and elastically supports the rotation support member 1302, so that the worm shaft 102 is compressed by the clearance compensation member 1303 in the direction in which the worm shaft 102 is engaged with the worm wheel 103.

As the clearance compensation member 1303, a coil spring or the like may be used as illustrated in the drawings.

In order to prevent the clearance compensation member 1303 from escaping from the long hole 1301c, the rotation support member 1302 may include an insertion portion 1302a configured to protrude, and the damper support member 1301 may include a seating portion 1301b configured to be recessed.

The damper support member 1301 may include a protrusion 1301a axially protruding so as to be supported by the damper 113.

That is, the protrusion 1301a is provided so as to be supported by the outer diameter portion of the first support portion or member 301, so that even if the axial and radial movements of the worm shaft 102 are generated, it is possible to prevent the occurrence of noise, which is generated when the inner diameter portion of the first support portion or member 301 collides with the damper support member 1301.

According to the reducer on electric power steering apparatus, which has the shapes described above, since the bearings are supported by the housing at the opposite ends of the worm shaft, it is possible to assemble the worm shaft with constant rotational torque at an accurate position with respect to the centers of the bearings at the opposite ends.

In addition, by buffering the axial and radial movements of the worm shaft and reducing the load applied to the worm shaft in the direction in which the worm shaft is engaged with the worm wheel, the rotational torque and noise generated due to friction between the worm shaft and the worm wheel are reduced, whereby a pleasant steering feeling can be provided.

Although all the elements constituting embodiments of the present disclosure have been described above as being combined into a single unit or combined to be operated as a single unit, the present disclosure is not necessarily limited to such embodiments. That is, at least two elements of all structural elements may be selectively joined and operate without departing from the scope of the present disclosure.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

The above embodiments have been described merely for the purpose of illustrating the technical idea of the present disclosure, and those skilled in the art will appreciate that various modifications and changes are possible without departing from the scope and spirit of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A reducer of an electric power steering apparatus, the reducer comprising:
   a worm shaft having a first end coupled to a damping coupler and rotatably coupled to a first bearing coupled to a housing and a second end rotatably coupled to a second bearing coupled to the housing;
   a damper disposed on an outer race of the second bearing to support the second bearing in an axial direction with respect to the worm shaft; and
   a damper support member having a first side contacting the damper to support the damper in the axial direction and a second side disposed on an inner face of the housing, wherein the damper support member supporting the damper disposed between the second bearing and a third bearing has a through hole penetrating inner and outer peripheral surfaces of the damper support member;

a clearance compensation mechanism coupled to the housing, the clearance compensation mechanism comprising a compression member inserted into the through hole of the damper support member to compress the third bearing; and an elastic body disposed between an inner race of the second bearing and an outer peripheral surface of the worm shaft, wherein an air gap is formed between the inner race of the second bearing and the outer peripheral surface of the worm shaft by the elastic body disposed between the inner race of the second bearing and the outer peripheral surface of the worm shaft.

2. The reducer of claim 1, wherein the damper comprises a first support portion supported by the damper support member, a second support portion supporting the outer race of the second bearing, and a damping portion disposed between the first support portion and the second support portion.

3. The reducer of claim 2, wherein the damping portion of the damper is disposed between inner radial portions of the first and second support portions of the damper.

4. The reducer of claim 2, wherein each of the first and second support portions of the damper comprises a stepped portion disposed on outer faces of each of the first and second support portions.

5. The reducer of claim 2, wherein the damping portion of the damper comprises a circumferential groove disposed on an outer peripheral face of the damping portion.

6. The reducer of claim 5, wherein the damping portion of the damper comprises two or more circumferential grooves.

7. The reducer of claim 5, wherein the damper is made of a material having rigidity smaller than rigidity of the damping portion, and comprises a filler disposed in the circumferential grooves.

8. The reducer of claim 2, wherein the damping portion of the damper has an outer peripheral face, which is radially convex.

9. The reducer of claim 2, wherein the damping portion of the damper comprises a hollow portion disposed inside the damping portion or disposed at an outer diameter side of the damping portion.

10. The reducer of claim 9, wherein the damper is made of a material having rigidity smaller than rigidity of the damping portion, and comprises a filler provided in the hollow portion of the damping portion.

11. The reducer of claim 1, wherein the damper support member has a hollow shape, and the second end of the worm shaft is coupled with the third bearing disposed inside the damper support member.

12. The reducer of claim 1, wherein the through hole penetrates the inner and outer peripheral surfaces of the damper support member in a direction in which the worm shaft and the worm wheel are engaged with each other.

13. The reducer of claim 1, wherein the clearance compensation mechanism further comprises a coupling member coupled to the housing, and an elastic member having elasticity and disposed between the compression member and the coupling member.

14. The reducer of claim 1, wherein the damper support member comprises a hole elongated in a direction in which the worm shaft and the worm wheel are engaged with each other, and the second end of the worm shaft is coupled with a rotation support member inserted into the hole of the damper support member.

15. The reducer of claim 14, wherein the clearance compensation member comprises a first end coupled to the rotation support member and a second end coupled to the damper support member, and the clearance compensation member is configured to compress the rotation support member.

16. The reducer of claim 14, wherein the damper support member comprises a protrusion protruding in the axial direction to support the damper.

17. The reducer of claim 1, wherein the damper comprises a first support portion supported by the damper support member, a second support portion supporting the second bearing, and a damping portion disposed between the first support portion and the second support portion and having rigidity smaller than the first and/or second support portions.

18. The reducer of claim 1, wherein a part of the elastic body disposed between the inner race of the second bearing and the outer peripheral surface of the worm shaft is inserted in a recess formed on the outer peripheral surface of the worm shaft to limit movement of the elastic body.

* * * * *